US011223306B2

(12) United States Patent
Roetzer et al.

(10) Patent No.: US 11,223,306 B2
(45) Date of Patent: Jan. 11, 2022

(54) METHOD FOR DETERMINING THE ROTOR POSITION OF AN ELECTRIC ROTATING MACHINE, AND AN ELECTRIC ROTATING MACHINE FOR CARRYING OUT A METHOD OF THIS KIND (71) Applicant: Robert Bosch GmbH, Stuttgart (DE)

(72) Inventors: Marco Roetzer, Epfendorf (DE); Ulrich Vollmer, Weilheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/628,723

(22) PCT Filed: Jun. 22, 2018

(86) PCT No.: PCT/EP2018/066832
§ 371 (c)(1),
(2) Date: Jan. 6, 2020

(87) PCT Pub. No.: WO2019/020295
PCT Pub. Date: Jan. 31, 2019

(65) Prior Publication Data
US 2020/0195175 A1 Jun. 18, 2020

(30) Foreign Application Priority Data

Jul. 28, 2017 (DE) ...................... 10 2017 213 069.5

(51) Int. Cl.
*H02P 6/10* (2006.01)
*H02P 6/18* (2016.01)
(52) U.S. Cl.
CPC ................ *H02P 6/10* (2013.01); *H02P 6/183* (2013.01); *H02P 2203/11* (2013.01)

(58) Field of Classification Search
CPC .. H02P 6/183; H02P 2203/05; H02P 2203/11; H02P 6/10; H02P 25/089; H02P 21/00; H02P 25/22; H02P 27/04
See application file for complete search history.

(56) References Cited

U.S. PATENT DOCUMENTS 9,923,504 B2 * 3/2018 Mori ........................ H02P 25/22
10,084,399 B2 * 9/2018 Campbell ............... H02P 21/18
(Continued)

FOREIGN PATENT DOCUMENTS

CN 105680756 A 6/2016
DE 10 2009 039 672 A1 3/2011
(Continued)

OTHER PUBLICATIONS

International Search Report corresponding to PCT Application No. PCT/EP2018/066832, dated Oct. 4, 2018 (German and English language document) (5 pages).
(Continued)

*Primary Examiner* — Bickey Dhakal
(74) *Attorney, Agent, or Firm* — Maginot, Moore & Beck LLP (57) ABSTRACT The disclosure relates to a method for determining a rotor position of an electric rotating machine. The electric machine comprises at least one first, multi-phase subsystem and one second multi-phase subsystem, which each comprise a PWM-controlled inverter for feeding respective winding groups. The winding groups of the at least first and second subsystems are arranged substantially electrically offset from one another by 360°. In the method, voltages predefined by a controller are altered by feeding high-frequency voltages in order to attain high-frequency current changes. The current changes are then detected in that a current curve of phase currents is ascertained for each subsystem by measuring at least one first phase current and (Continued)

one second phase current. The rotor position is then determined depending on the ascertained current curves and the fed high-frequency voltages. The disclosure additionally relates to an electric machine which is designed for carrying out the method.

11 Claims, 4 Drawing Sheets

(56) References Cited

U.S. PATENT DOCUMENTS

| | | | |
|---|---|---|---|
| 2002/0113569 A1* | 8/2002 | Iijima | H02P 6/183 318/727 |
| 2011/0101906 A1 | 5/2011 | Tagome | |
| 2012/0153883 A1 | 6/2012 | Hammel et al. | |
| 2018/0105201 A1* | 4/2018 | Mori | H02P 6/18 |
| 2019/0140499 A1* | 5/2019 | Takahashi | H02P 6/183 |
| 2019/0149077 A1* | 5/2019 | Sumasu | H02P 27/08 318/400.02 |
| 2019/0238073 A1* | 8/2019 | Kimura | H02K 3/28 |

FOREIGN PATENT DOCUMENTS

| | | |
|---|---|---|
| DE | 20 2016 106 678 U1 | 1/2017 |
| JP | 2006-50709 A | 2/2006 |
| JP | 2007-124836 A | 5/2007 |
| JP | 2012165608 A * | 8/2012 |
| JP | 2017-36001 A | 2/2017 |
| JP | 2017-118603 A | 6/2017 |
| WO | 2014/080497 A1 | 5/2014 |
| WO | 2016/189694 A1 | 12/2016 |

OTHER PUBLICATIONS

Pulvirenti, M. et al., "Secondary Saliencies Decoupling Technique for Self-Sensing Integrated Multi-Drives," 2016 IEEE Symposium on Sensorless Control for Electrical Devices (SLED), pp. 1-6; 2016 (6 pages).

* cited by examiner

METHOD FOR DETERMINING THE ROTOR POSITION OF AN ELECTRIC ROTATING MACHINE, AND AN ELECTRIC ROTATING MACHINE FOR CARRYING OUT A METHOD OF THIS KIND

This application is a 35 U.S.C. § 371 National Stage Application of PCT/EP2018/066832, filed on Jun. 22, 2018, which claims the benefit of priority to Serial No. DE 10 2017 213 069.5, filed on Jul. 28, 2017 in Germany, the disclosures of which are incorporated herein by reference in their entirety.

BACKGROUND

The disclosure relates to a method for determining a rotor position of a rotating electric machine.

Such a method is disclosed in, for example, the document DE 10 2009 039 672 A1. An encoderless control is disclosed here, which attempts to determine the rotor position without the use of a position sensor. At low rotation speeds what are known as anisotropy-based methods are used here, which determine the rotor position by means of the magnetic anisotropy of the machine. An inverter with pulse width modulation (PWM) is usually used to generate the adjustable phase voltage of the electric machines of highly dynamic drives. The control signals of the inverter are calculated with the aid of a space vector modulation which converts the predefined voltages determined by the controller into PWM duty ratios. The predefined voltages are determined by the controller depending, for example, on the rotor position and on the ascertained phase currents, as well as on certain requirements of the electric machine, such as the rotation speed or torque. In common anisotropy-based methods, a position-dependent current change is produced through a deliberate change of the predefined voltages between two controller sampling steps, in that high-frequency voltages are induced in addition to the voltage predefined by the controller. The current change resulting from this can thereupon be ascertained through current measurements of the respective phase currents of the electric machine at specific time points. Depending on the ascertained phase currents and on the voltages injected, the rotor position can then be determined, as is disclosed, for example, in the above-mentioned patent application.

SUMMARY

The disclosure relates to a method for determining a rotor position of an electric rotating machine, wherein the electric machine comprises at least one first multi-phase subsystem and one second multi-phase subsystem, whereby each subsystem comprises a winding group and a PWM-controlled inverter for feeding the respective winding group, wherein the winding groups of the at least first and second subsystem are arranged offset electrically by essentially 360° to one another. The method comprises the method steps of:
 a. changing voltages predefined by a controller for drive of the subsystems between a first controller sampling step and a second controller sampling step, in that for each subsystem respectively high-frequency voltages are injected as well as the predefined voltages in order in each case to achieve a position-dependent change in the current, wherein the high-frequency voltages of the at least first and of the second subsystem are selected in such a way that they have a displaced phase position with respect to one another, and wherein the predefined voltages of the at least first and second subsystem are selected in such a way that they have essentially the same phase position with respect to one another,
 b. PWM-synchronous measurement of at least one first phase current and of one second phase current for each subsystem between the first controller sampling step and the second controller sampling step in order in each case to obtain a current curve of the phase currents,
 c. determining the rotor position depending on the current curves obtained in method step b and the high-frequency voltages injected in method step a.

It is advantageous here that as a result of the shifted phase position of the high-frequency voltages of the subsystems, a ripple in the torque of the electric machine generated by the anisotropy-based method, and thus in particular by injecting the high-frequency voltages, can be reduced. In this way a noise that is generated by the rotor position determination when the electric machine is operated can in turn be reduced.

Encoderless determination of the rotor position which only negligibly impairs the properties of the electric machine during operation can thus be achieved through the method. It is moreover also possible according to the disclosure that the result of an existing rotor position sensor is validated by the method.

The subsystems of the electric machine are here in particular each of three-phase design, and each comprise inter alia a winding group and a PWM-controlled inverter for feeding the respective winding group.

It would also be conceivable for the electric machine to comprise, in addition to the first and second subsystem, another third or fourth subsystem or even an arbitrary number of further subsystems which are then in particular each also arranged offset electrically to one another by 360°.

Essentially the same phase position of the predefined voltages of the first and second subsystem is to be understood here to refer to a maximum deviation of a few degrees, which results, for example, from external interfering influences or tolerances resulting from manufacture of the respective subsystems.

Electrically offset from one another by 360° is to be understood here to mean that the winding groups of a pair of different subsystems are mechanically arranged offset with respect to one another by an integral multiple of 360° divided by the number of poles of the electric machine. A multiple can here also mean 1.

In one embodiment of the method according to the disclosure, it is provided that in method step a the high-frequency voltages of the at least first and second subsystem are selected such that the high-frequency voltages have phase positions offset with respect to one another by an n-multiple of 360° divided by the number of subsystems, where n is an integer.

It is advantageous here that the noise development can be further optimized through this corresponding shift in the phase position, in that, for example, the high-frequency voltages of two subsystems are selected such that they are in opposite directions in the coordinate system oriented to rotor flux. In this way a total voltage vector resulting from them can advantageously be truly small, whereby the corresponding ripple in the torque of the electric machine can be kept small. As a consequence, through such a choice of the high-frequency voltages, the noise development caused by the method according to the disclosure for determining the rotor position is further reduced.

In the case of two subsystems, the high-frequency voltages can have a phase difference of for example 180° with respect to one another. In the case of three subsystems, a shift in the phase position of the high-frequency voltages of for example 120° respectively for each subsystem would be possible. In the case of four subsystems there is, for example, a possibility that the subsystems have a phase difference of 0°, 90°, 180° and 270° to one another. It is, however, also possible for the high-frequency voltages of each of two subsystems to be injected in the same direction, and to be injected into the other two subsystems with a phase position shifted by 180° in comparison to the first two subsystems.

It is provided according to one embodiment of the method according to the disclosure, that in method step a amplitudes of the high-frequency voltages of the at least first and second subsystem are selected in such a way that a total of all the voltage vectors of the high-frequency voltages of the subsystems in the coordinate system oriented to rotor flux yields a zero vector.

It is advantageous here that through the additional adjustment of the high-frequency voltages in terms of their amplitude, the generation of a ripple in the torque resulting from the determination of the rotor position can even be completely avoided. The zero vector means that in three-phase subsystems, the total of the high-frequency voltages of all the first phases, the total of the high-frequency voltages of all the second phases and the total of the high-frequency voltages of all the third phases yields zero.

According to one embodiment of the method according to the disclosure, it is provided that in method step c the respective current change for the at least first and second subsystem that arises from the changing of the predefined voltages is determined depending on the current curve of the phase currents determined in method step b, wherein the current curve is divided into a first current that would flow without changing the predefined voltage and a second current that is generated through the injection of the high-frequency voltages, and wherein the rotor position is determined depending on the current change determined in each case. The corresponding determination of the rotor position is, for example, disclosed in the above-mentioned prior art.

It is advantageous here that this represents a simple possibility of determining the rotor position, in this way the necessary computational effort can be kept small and the rotor position determination can take place quickly.

In one embodiment of the method according to the disclosure it is provided that the second current that is generated through the injection of the high-frequency voltages, is determined in that a difference between the phase currents obtained in method step b of the at least first and second subsystem is formed.

It is advantageous here that, due to the identical phase positions of the predefined voltages of the subsystems, the first current that would flow without changing the predefined voltages mutually cancels out when the difference is formed, and the second current that is generated by the injection of the high-frequency voltages can thus be determined very easily. In contrast, due to the shifted phase positions of the high-frequency voltages, the second current does not mutually cancel itself out.

According to one embodiment of the method according to the disclosure it is provided that the first current that would flow without changing the predefined voltage is determined in that a mean value of the phase currents of the at least first and second subsystem obtained in method step b is formed.

It is advantageous here that, due to the shifted phase positions of the high frequency voltages of the subsystems, the second current that is generated through the injection of the high-frequency voltages mutually cancels itself out at least to a certain degree in the formation of the mean value, and the first current, which would flow without changing the predefined voltages can be determined very easily. The first current, due to the identical phase position of the predefined voltages, similarly does not cancel itself out.

According to one embodiment of the method according to the disclosure, it is provided that a controller sampling period that represents the duration between the first controller sampling step and the second controller sampling step is greater than one PWM period.

It is advantageous here that due to the PWM-synchronous measurement of the phase currents, more measured values are ascertained than are actually necessary for determining the rotor position. The signal-to-noise ratio can thus be improved in this way.

It can be assumed here that the difference between the phase currents that is used for calculating the high-frequency currents has a low-frequency error that is estimated and compensated for. This low-frequency error component results, for example, from tolerances due to manufacture of the respective subsystems or also of winding groups. The estimation of the error can be carried out in particular with the aid of the method of least error squares. It can be assumed here that the voltages predefined by the controller are constant between two controller sampling steps. The low-frequency error component can here be described through a model function, preferably through a low-order polynomial, during periods of time in which the voltages predefined by the controller are constant. The high-frequency currents that arise through the injection of the high-frequency voltages can also be described by a linear equation depending on the rotor-position-dependent inverse inductance, or depending on the rotor position error. While the predefined voltages are constant, the temporal progression of the difference between the phase currents can be described with the aid of a linear equation system. If the controller sampling frequency, which represents the inverse of the regular sampling period, is now chosen to be significantly smaller than the PWM frequency, then significantly more phase current values are ascertained than are necessary for the solution of the linear equation system. The method of least error squares can now be used in order to solve the over-determined equation system. This means that the smaller the controller sampling frequency is chosen to be in comparison with the PWM frequency, the better the signal-to-noise ratio of the solution parameters that are determined becomes.

According to one embodiment of the method according to the disclosure, it is provided that the high-frequency voltages have a frequency range that is located above a resonant frequency of the mechanical vibrations that can be generated at a housing of the electric machine. It is advantageous here that, through the selection of a corresponding frequency range for the high-frequency voltages, a development of noise as a result of the injection of the high-frequency voltages into the respective subsystems can be reduced or does not occur at all.

Due to the injection of the high-frequency voltages, high-frequency radial forces, which have essentially the same frequency as the high-frequency voltages, act on the stator of the electric machine. Depending on the topology of the electric machine and the selection of the high-frequency voltages, the radial forces that are generated by the high-frequency voltages have different spatial orders. The stator is excited into vibrations by the forces. The modes of the mechanical vibration are usually identical to the spatial orders of the forces, while the resonance frequency is different for each mode. It is consequently advantageous if the frequency range of the high-frequency voltages lies above the resonant frequency of the excited modes, in order in that way to minimize the mechanical vibrations.

The disclosure further relates to an electric rotating machine with at least one first multi-phase subsystem and one second multi-phase subsystem. Each subsystem comprises a winding group and a PWM-controlled inverter for feeding the respective winding group. The winding groups of the at least first and second subsystem are furthermore essentially arranged offset 360° with respect to one another. The electric machine is furthermore configured to carry out a method according to the disclosure.

It is advantageous here that, as a result of the shifted phase position of the high-frequency voltages of the subsystems, a ripple in the torque of the electric machine that is caused by the anisotropy-based method, and thereby through the injection of the high-frequency voltages, can be reduced. Through this, a noise development that is generated when the electric machine is operated by the rotor position determination can in turn be reduced.

According to one embodiment of the electric machine according to the disclosure, it is provided that the winding groups of the at least first and second subsystem are connected to one another in such a way that an essentially constant inductance matrix is found in a rotor-flux-oriented coordinate system.

It is advantageous here that an easy determination of the rotor position is enabled. This is due to the fact that there are different possibilities for how the windings of the individual winding groups of the subsystems can be connected together. Depending on the interconnection of the subsystems or of the winding groups, the electric machine exhibits different symmetry properties. This has, above all, effects on the magnetic couplings between the individual phases. Thus, in the rotor-flux-oriented coordinate system, the phase and coupling inductances of an electric machine with separate subsystems have additional mathematical orders over a machine with interwoven windings. These additional orders in turn make the determination of the rotor position by means of an anisotropy-based method more difficult, since the additional orders have to be known in order to be able to deduce the rotor position from a high-frequency current change. Through an interconnection of the winding groups that leads to a constant inductance matrix of the electric machine, the additional orders can be minimized, and the determination of the rotor position thus kept simple.

According to one embodiment of the electric machine according to the disclosure, it is provided that the at least first and second subsystem comprise a common intermediate voltage circuit.

It is advantageous here that, in addition to the ripple in the torque, a battery current ripple that is generated as a result of the injection of the high-frequency voltages into the respective subsystems and flows in the feed lines to the inverters, can be minimized.

DETAILED DESCRIPTION

Figure 1:
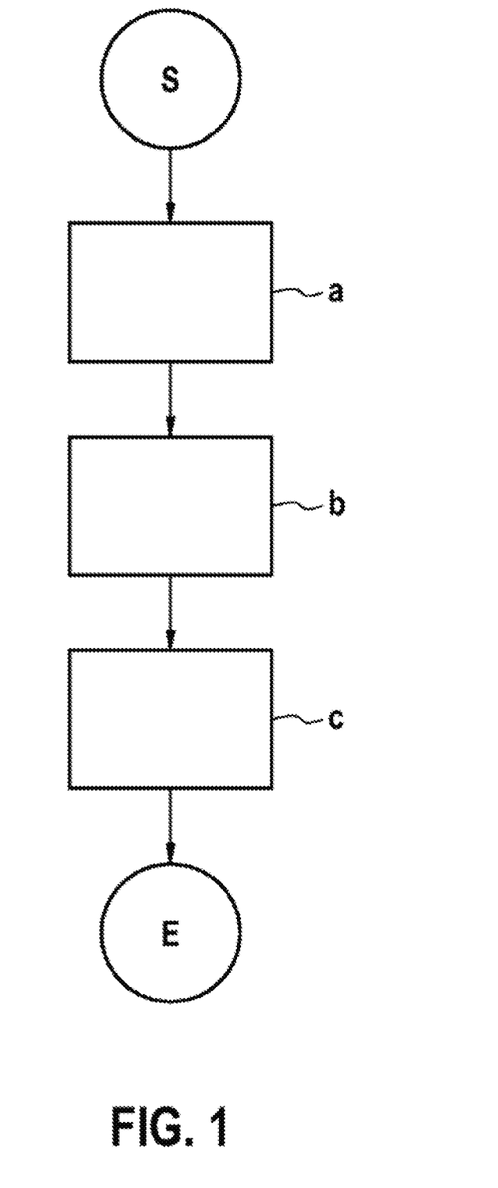
FIG. 1 shows an exemplary embodiment of a method according to the disclosure for determining a rotor position of an electric rotating machine.

FIG. 1 shows an exemplary embodiment of a method according to the disclosure for determining a rotor position of an electric rotating machine. The electric machine 10, for example according to FIG. 2, here comprises at least one first multi-phase subsystem 21 and a second multi-phase subsystem 22. The subsystems 21, 22 are in particular of three-phase design. Each subsystem 21, 22 further comprises a winding group 31, 32 and a PWM-controlled inverter 41, 42 for feeding the respective winding group 31, 32. The winding groups 31, 32 of the at least first and second subsystem 21, 22 are essentially arranged offset electrically by 360° with respect to one another.

In the method illustrated in the exemplary embodiment according to FIG. 1, after the start S, predefined voltages $u_{control}$ specified by controller 50 for drive of the two subsystems 21, 22 are changed in a method step a for each of the subsystems 21, 22 between a first controller sampling step and a second controller sampling step, in that, in addition to the predefined voltages $u_{control}$ high-frequency voltages $u_{inj}$ are injected in order to achieve a position-dependent current change. For each subsystem 21, 22, the high-frequency voltages $u_{inj}$ are added here to the predefined voltages $u_{control}$, and then converted into a PWM duty ratio for drive of the respective subsystem 21, 22. The high-frequency voltages $u_{inj}$ of the at least first and of the second subsystem 21, 22 are chosen here in such a way that they exhibit a shifted phase position to one another. Thus, for example, the high-frequency voltages $u_{inj}$ of the first subsystem 21 can have a phase position shifted through 180° with respect to the high-frequency voltages $u_{inj}$ of the second subsystem 22. In addition, the high-frequency voltages $u_{inj}$ of the two subsystems 21, 22 can be chosen in such a way in terms of their amplitude that a total of all the voltage vectors of the high-frequency voltages $u_{inj}$ of the subsystems 21, 22 yields a zero vector. In the case of a phase displacement of 180° of the high-frequency voltages $u_{inj}$ of the two subsystems, the amplitudes can thus be selected to be identical in order to obtain a zero vector in total. The predefined voltages $u_{control}$ of the at least first and of the second subsystem 21, 22 are furthermore chosen such that they exhibit an essentially equal phase position to one another. The duration between the first controller sampling step and the second controller sampling step can, in particular, be chosen such that it is several times greater than the duration of a PWM period.

Following method step a, at least one first phase current and a second phase current are measured in a PWM-synchronous manner in a method step b for each subsystem 21, 22 between the first controller sampling step and the second controller stamping step, in order to obtain in each case a current curve of all the phase currents. In the case for example of an electric machine 10 with subsystems 21, 22 of three-phase design, if only the first phase current and the second phase current of the respective subsystem 21, 22 are measured, then a third phase current of the respective subsystem 21, 22 can be determined from the first phase current and the second phase current by means of Kirchoff's first law:

$$i_c = -i_a - i_b$$

Alternatively, the third phase current of the respective subsystem 21, 22 can also be measured.

Then, in a method step c, the rotor position of the electric machine 10 is determined depending on the current curves obtained in method step b and on the high-frequency voltages $u_{inj}$ injected in method step a, and the method is then ended. The rotor position can here in particular be determined in that the current change that arises through changing the predefined voltage $u_{control}$ in method step a is determined. The determination of the current change takes place here depending on the current curve of the phase currents obtained in step b and on the high-frequency voltages $u_{inj}$ in in method step a. The current curve obtained in method step b is divided for this purpose into a first current that would flow without a change to the predefined voltage $u_{control}$ and a second current that is created by the change of the voltage $u_{control}$. The second current can, for example, be determined in that a difference is formed between the phase currents of the at least first and the second subsystem 21, 22 obtained in method step b. Furthermore, the first current can, for example, be determined in that a mean value of the phase currents of the at least first and the second subsystem 21, 22 obtained in method step b is formed.

In an alternative exemplary embodiment not illustrated in the figures, the method can be regularly restarted in order to determine the rotor position of the electric machine continuously.

Figure 2:
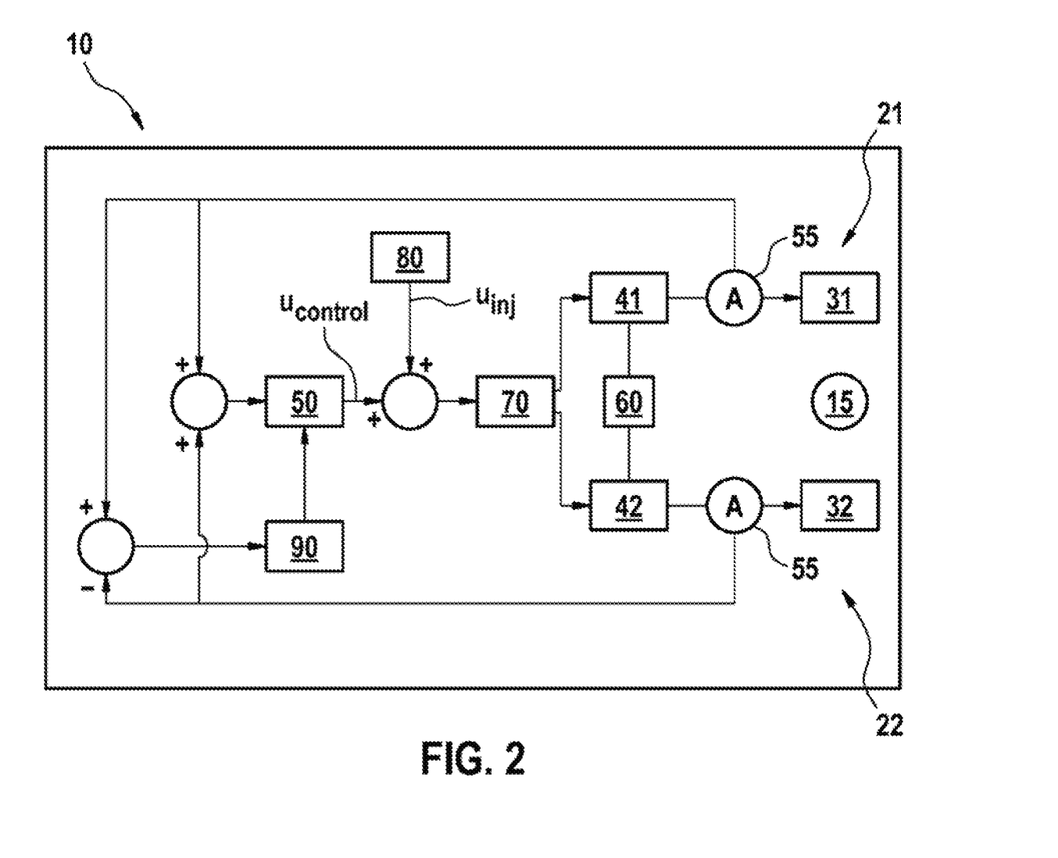
FIG. 2 shows an exemplary embodiment of an electric rotating machine according to the disclosure that is configured to carry out a method according to the disclosure.

FIG. 2 shows an exemplary embodiment of an electric rotating machine according to the disclosure that is configured to carry out a method according to the disclosure.

An electric machine 10 is shown. The electric machine 10 comprises a permanent magnetic rotor 15 that is surrounded by a winding group 31 of a first multi-phase subsystem. 21 and a winding group 32 of a second multi-phase subsystem 22. The subsystems 21, 22 are here, in particular, of three-phase design, although this is not illustrated in the figures. The winding groups 31, 32 are arranged on a stator, not illustrated in the figures, in such a way that the winding groups 31, 32 of the at least first and second subsystem 21, 22 are arranged with an electrical offset with respect to one another of essentially 360°. The winding group 31 of the first subsystem 21 is, furthermore, connected to an inverter 41 that energizes the winding group 31. The winding group 32 of the second subsystem 22 is correspondingly connected to an inverter 42. The two inverters 41, 42 of the two subsystems 21, 22 are in turn connected to a PWM unit 70 which appropriately controls the inverters 41 and 42. The PWM unit 70 here receives predefined voltages $u_{control}$ from a controller 50 for each subsystem 21, 22, and high-frequency voltages $u_{inj}$ from a high-frequency excitation unit 80, which are added together and converted into corresponding PWM duty ratios by the PWM unit 70. The high-frequency voltages $u_{inj}$ of the at least first and of the second subsystem 21, 22 are chosen here in such a way that they exhibit a shifted phase position to one another. The predefined voltages $u_{control}$ of the at least first and of the second subsystem 21, 22 are in addition chosen such that they exhibit an essentially equal phase position to one another. The first subsystem 21 and the second subsystem 22 are furthermore connected to a common voltage intermediate circuit 60.

In the case of three-phase subsystems 21, 22, the electric machine 10 comprises a current measuring sensor unit 55 for at least one first phase and a second phase of each subsystem 21, 22. A corresponding phase current can be ascertained by means of this current measuring sensor unit 55. The values of the acquired phase currents are here made available both to the controller 50 and to a rotor position unit 90. The rotor position unit 90 is configured here to determine a rotor position of the rotor 15 depending on the corresponding current curves of the phase currents, and to convey his rotor position inter alia to the controller 50. The controller 50 is configured to determine the predefined voltages $u_{control}$ for the first and second subsystem 21, 21 depending on the current curves of the phase currents and on the received rotor position, and to convey these predefined voltages $u_{control}$, as already described, to the PWM unit 70.

Figure 3A:
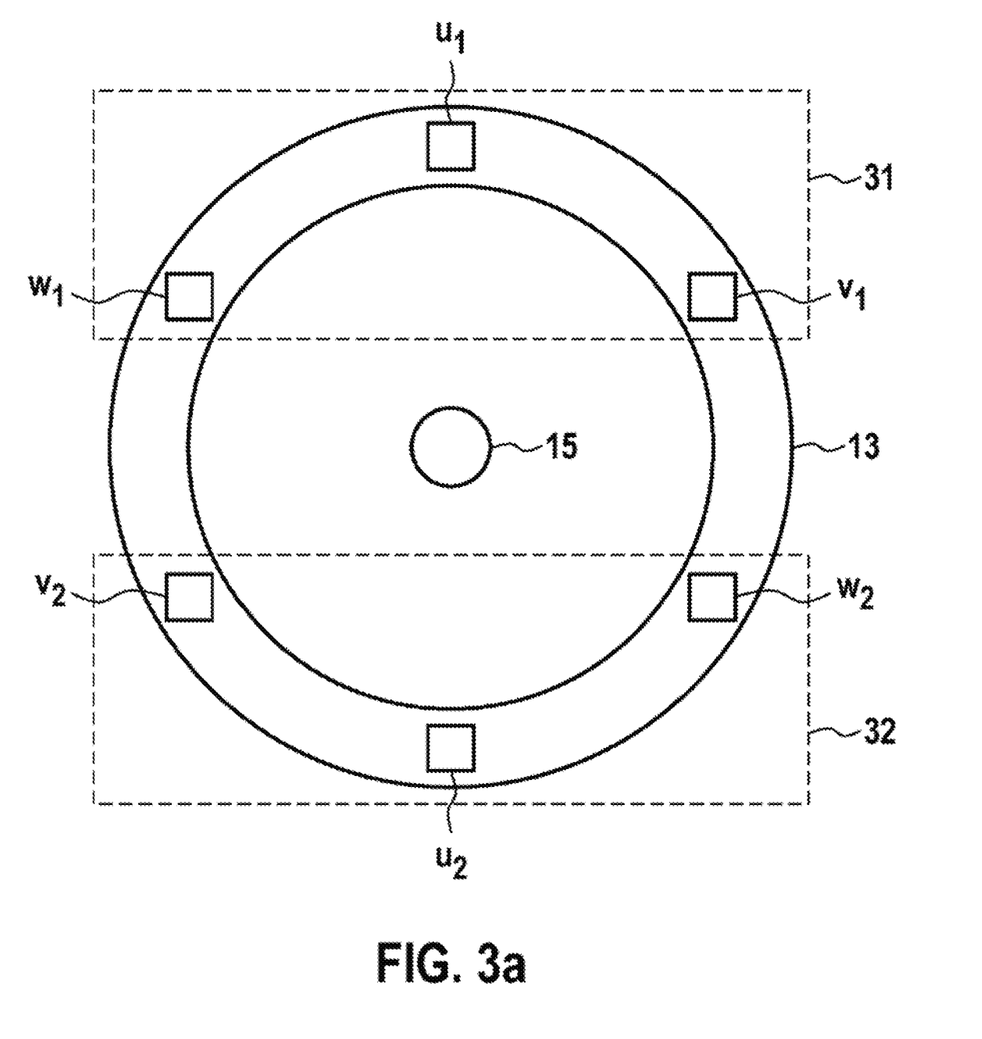
FIGS. 3a and 3b show two different arrangements of winding groups of a first and second subsystem of an electric machine for example according to FIG. 2 in detail.
Figure 3B:
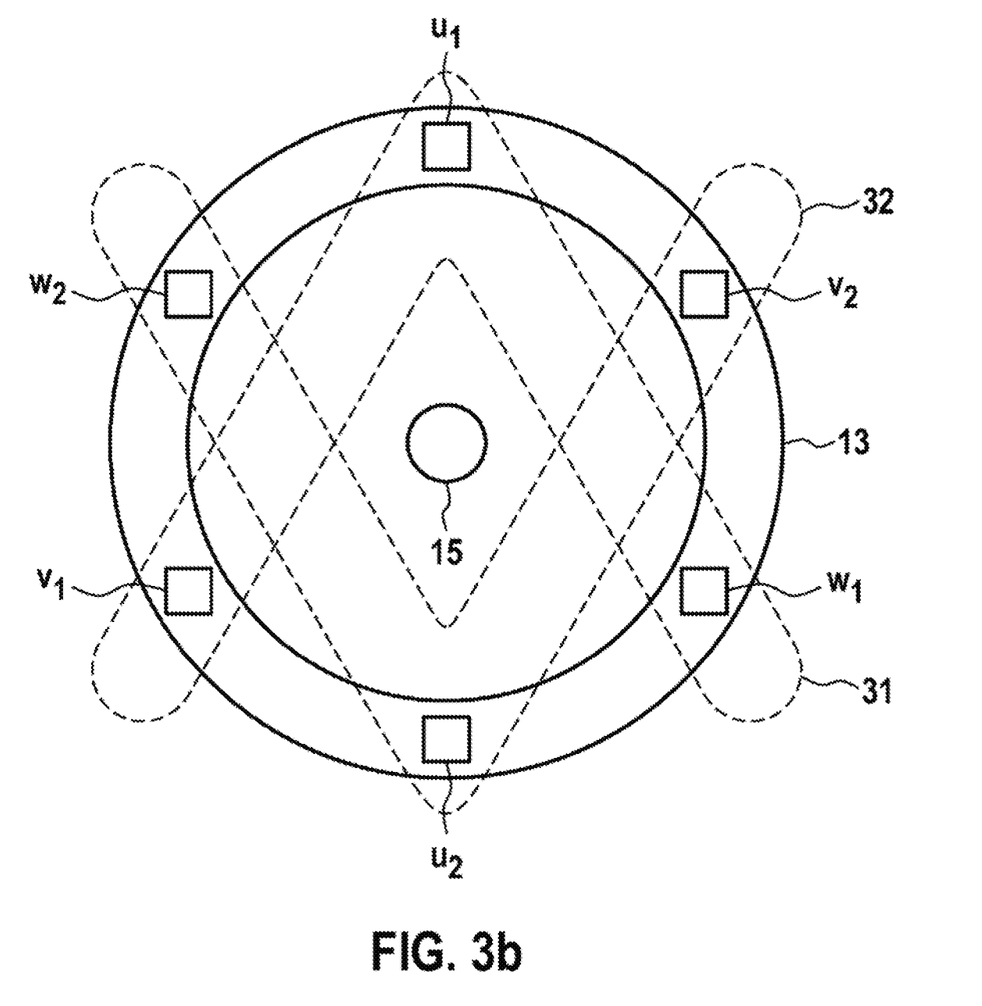

FIGS. 3a and 3b show two different arrangements of winding groups of a first and second subsystem of an electric machine for example according to FIG. 2 in detail. Respective winding groups 31, 32 of the first and second subsystem. 21, 22 which are arranged at a stator 13 of the electric machine 10 and around a rotor 15 of the electric machine 10, are illustrated in FIGS. 3a and 3b. The winding groups 31, 32 are each of three-phase design, and therefore each comprise a coil for each phase. The first winding group 31 of the first subsystem 21 accordingly comprises one coil for each of the phases $u_1$, $v_1$ and $w_1$. The second winding group 32 of the second subsystem 22 correspondingly comprises one coil for each of the phases $u_2$, $v_2$ and $w_2$. The coils of the winding groups 31, 32 are arranged in FIGS. 3a and 3b with an electrical offset of 360° with respect to one another, and, due to their respective arrangement, only lead to different symmetry properties of the electric machine 10 due to the magnetic coupling between the individual coils of the respective phases.

The invention claimed is:

1. A method for determining a rotor position of an electric rotating machine having at least one first multi-phase subsystem and at least one second multi-phase subsystem, each of the at least one first multi-phase subsystem and the at least one second multi-phase subsystem having a respective winding group and a respective PWM-controlled inverter configured to feed the respective winding group, the respective winding groups of the at least one first multi-phase subsystem and the respective winding groups of the at least one second multi-phase subsystem being arranged offset electrically by essentially 360° to one another, the method comprising:

changing predefined voltages of a controller configured to drive the at least one first multi-phase subsystem and the at least one second multi-phase subsystem between a first controller sampling step and a second controller sampling step, in that for each of the at least one first multi-phase subsystem and the at least one second multi-phase subsystem, respective high-frequency voltages are injected as well as the predefined voltages to achieve a position-dependent change in a respective current, the respective high-frequency voltages being selected such that they have a displaced phase position with respect to one another, the predefined voltages being selected such that they have essentially a same phase position with respect to one another;

measuring, PWM-synchronously, at least one first respective phase current and at least one second respective phase current for each of the at least one first multi-phase subsystem and the at least one second multi-phase subsystem between the first controller sampling step and the second controller sampling step in each case to obtain a respective current curve of the at least one first respective phase current and the at least one second respective phase current; and determining the rotor position based on the respective current curves and the respective high-frequency voltages.

2. The method as claimed in claim 1, the changing the predefined voltages further comprising:

selecting the respective high-frequency voltages such that the respective high-frequency voltages have phase positions offset with respect to one another by an n-multiple of 360° divided by a number of subsystems of the at least one first multi-phase subsystem and the at least one second multi-phase subsystem, where n is an integer.

3. The method as claimed in claim 1, the changing the predefined voltages further comprising:
selecting amplitudes of the respective high-frequency voltages such that a total of all voltage vectors of the respective high-frequency voltages of the at least one first multi-phase subsystem and the at least one second multi-phase subsystem in the coordinate system oriented to rotor flux yields a zero vector.

4. The method as claimed in claim 1, the determining the rotor position further comprising:
determining a respective current change for each of the at least one first multi-phase subsystem and the at least one second multi-phase subsystem that arises from the changing of the predefined voltages depending on the respective current curves;
dividing each of the respective current curves into a respective first current that would flow without the changing of the predefined voltages and a respective second current that is generated through the injection of the respective high-frequency voltages; and
determining the rotor position based on each of the respective current changes.

5. The method as claimed in claim 4, the determining the rotor position further comprising:
determining, in each case, the respective second current that is generated through the injection of the respective high-frequency voltages as a difference between the at least one first respective phase current and the at least one second respective phase current.

6. The method as claimed in claim 4, the determining the rotor position further comprising:
determining, in each case, the respective first current that would flow without the changing of the predefined voltages as a mean value of the at least one first respective phase current and the at least one second respective phase current.

7. The method as claimed in claim 1, wherein a controller sampling period that represents a duration between the first controller sampling step and the second controller sampling step is greater than one PWM period.

8. The method as claimed in claim 1, wherein the respective high-frequency voltages have a frequency range greater than a resonant frequency of mechanical vibrations that are generated at a housing of the electric rotating machine.

9. An electric rotating machine comprising:
at least one first multi-phase subsystem and a second multi-phase subsystem, each of the at least one first multi-phase subsystem and the at least one second multi-phase subsystem having a respective winding group and a respective PWM-controlled inverter configured to feed the respective winding group, wherein the respective winding groups of the at least one first multi-phase subsystem and the respective winding groups of the at least one second multi-phase subsystem being electrically offset with respect to one another by essentially 360°; and
a controller is configured to drive the at least one first multi-phase subsystem and the at least one second multi-phase subsystem, the controller configured to:
change predefined voltages between a first controller sampling step and a second controller sampling step, in that for each of the at least one first multi-phase subsystem and the at least one second multi-phase subsystem, respective high-frequency voltages are injected as well as the predefined voltages to achieve a position-dependent change in a respective current, the respective high-frequency voltages being selected such that they have a displaced phase position with respect to one another, the predefined voltages being selected such that they have essentially a same phase position with respect to one another;
measure, PWM-synchronously, at least one first respective phase current and at least one second respective phase current for each of the at least one first multi-phase subsystem and the at least one second multi-phase subsystem between the first controller sampling step and the second controller sampling step in each case to obtain a respective current curve of the at least one first respective phase current and the at least one second respective phase current; and
determine a rotor position based on the respective current curves and the respective high-frequency voltages.

10. The electric rotating machine as claimed in claim 9, wherein the respective winding groups of the at least one first multi-phase subsystem and the respective winding groups of the at least one second multi-phase subsystem are connected to one another such that an essentially constant inductance matrix is formed in a rotor-flux-oriented coordinate system.

11. The electric rotating machine as claimed in claim 9, wherein the at least one first multi-phase subsystem and the respective winding groups of the at least one second multi-phase subsystem have a common voltage intermediate circuit.

* * * * *